Fig. 4.

June 19, 1945.　　T. A. KEEN ET AL　　2,378,708
REGISTERING MECHANISM
Original Filed Aug. 7, 1939　　7 Sheets-Sheet 5

INVENTORS.
THOMAS A. KEEN
JAMES KILBURG
BY
Castberg & Roemer
ATTORNEYS

Patented June 19, 1945

2,378,708

UNITED STATES PATENT OFFICE 2,378,708

REGISTERING MECHANISM

Thomas A. Keen, San Mateo, and James Kilburg, Redwood City, Calif., assignors, by direct and mesne assignments, of one-half to Hannah M. Smith, Chicago, Ill., and one-half to said Thomas A. Keen Original application August 7, 1939, Serial No. 288,840, now Patent No. 2,299,396, dated October 20, 1942. Divided and this application November 12, 1940, Serial No. 365,202

1 Claim. (Cl. 235—31)

The present invention relates to registering mechanism and is directed particularly to mechanism suitable for registering the operations of machines such as ticket printing and issuing machines employed in the sale of tickets at races under the pari-mutuel system.

This application is a division of our co-pending application entitled "Ticket printing and issuing machine," Serial No. 288,840, filed August 7, 1939 which issued on October 20, 1942, is Patent No. 2,299,396. The machine disclosed in said co-pending application includes a ticket printing mechanism and keyboard controlled mechanism for selective setting of the type thereon and initiation of ticket printing and issuing operations of the machine. The keys of the machine are numbered to correspond with the numbers which identify the participants or entries in a race, and depression of any key effects setting of the printing mechanism and operation of the machine to print and issue a ticket bearing the number of the key depressed. It is desirable that the number of tickets issued, as well as the number of tickets sold on each of several entries, be registered by the machine, and it is to the mechanism for registering the same that the present application is particularly directed.

It is the object of the present invention to provide in combination with a ticket printing and issuing machine or the like improved mechanism for registering the sales of tickets thereby, together with mechanism for resetting the registering mechanism to zero.

A further object of the invention is to provide registering mechanism and zeroizing mechanism associated therewith for a ticket printing and issuing machine, which mechanisms are operated entirely by the same source of power which actuates the machine.

Further and more specific objects of the invention are made apparent in the following specification, wherein detailed reference is made to the accompanying drawings.

Figures 1, 2:
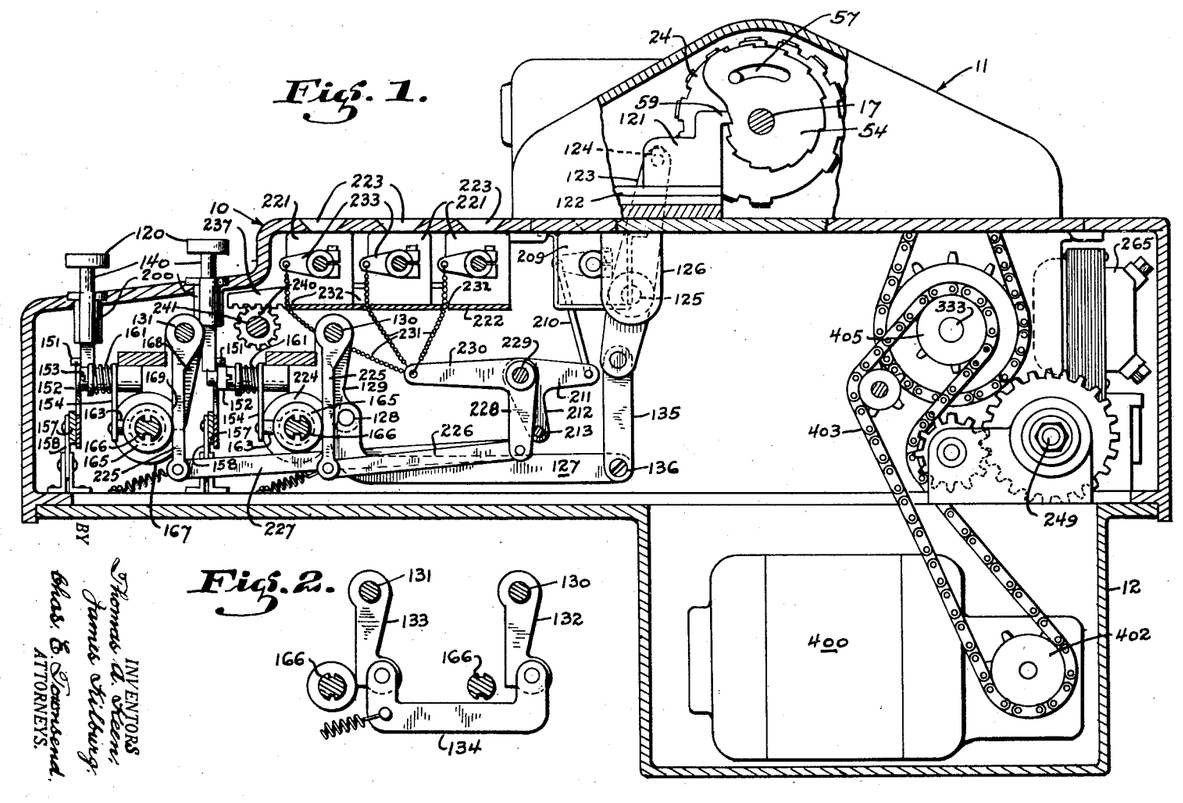
Fig. 1 is a vertical longitudinal sectional view with parts broken away of a machine embodying the present invention.
Fig. 2 is a detail view of a portion of the selecting mechanism illustrated in Fig. 1.

The machine of which the present invention is a part comprises, as best shown in Fig. 1, a main housing 10 which encloses type selecting mechanism controlled by the keys of a keyboard positioned adjacent the forward end of the housing, and the entire registering mechanism of the present invention, as well as power transmission and other mechanisms incidental to the operation of the machine.

A cover member 11 disposed on top of the housing 10 encloses the major part of a ticket printing mechanism, and a motor housing 12 depending downwardly from the housing contains a motor which supplies power for the ticket printing and issuing operations and which, through the present invention, also supplies the power consumed in the registration of ticket sales as well as the resetting or zeroizing of the registering devices.

Figures 9, 10:
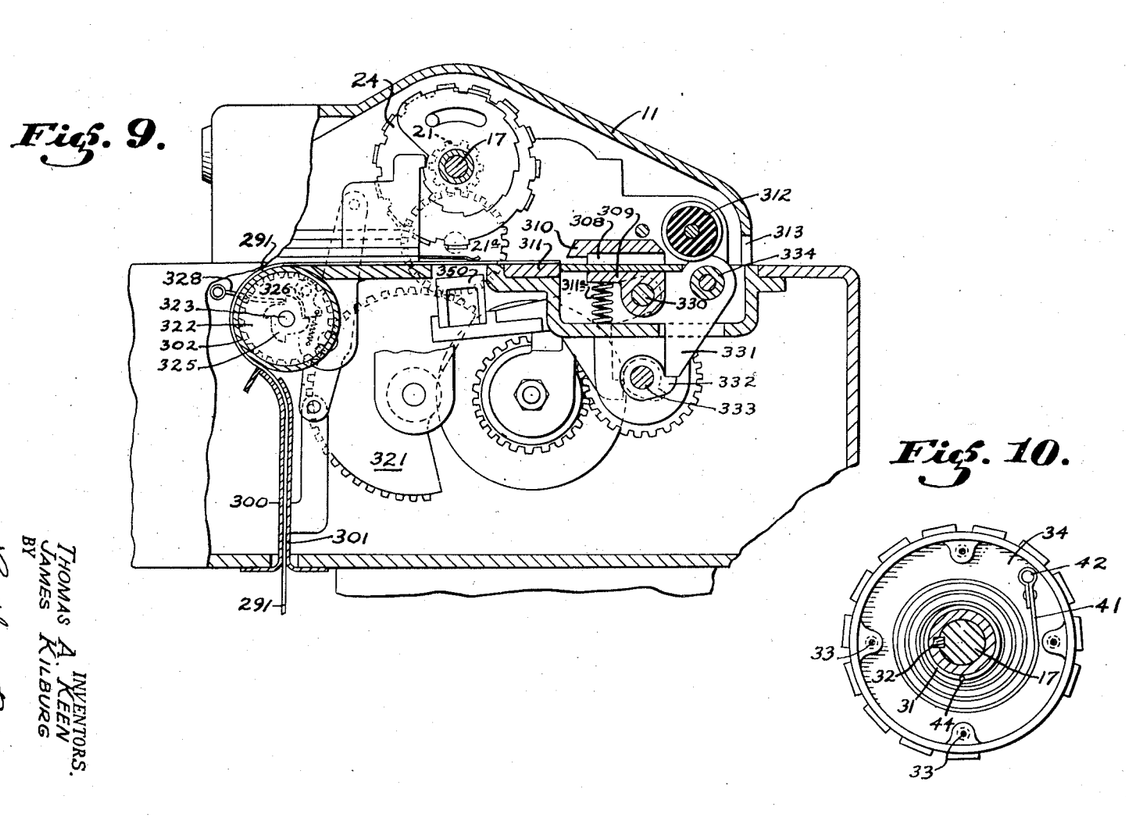
Fig. 9 is a side elevation of the upper portion of the machine with the side broken away and parts shown in section.
Fig. 10 is a side elevation of a type disc with its cover plate removed.
Figures 11, 12, 13, 14, 15:
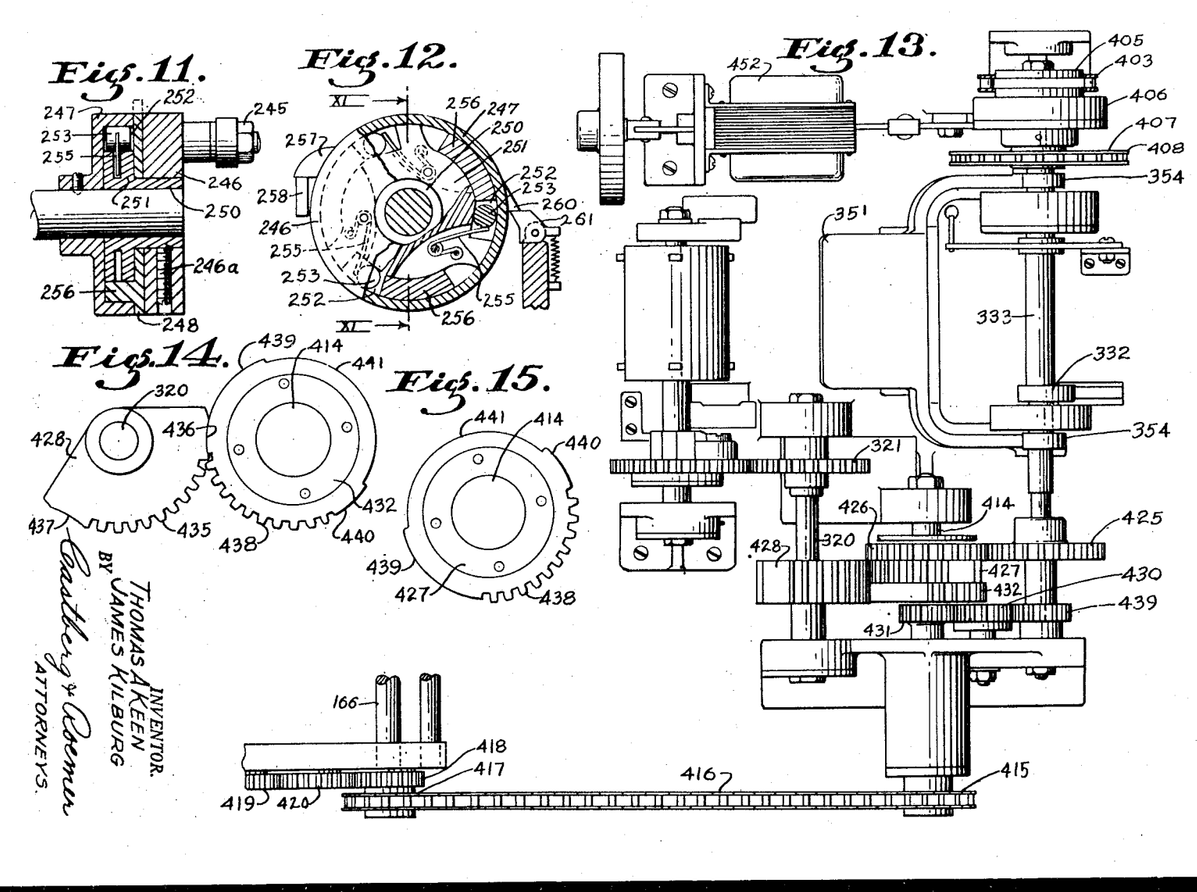
Fig. 11 is a horizontal sectional view of a clutch shown in Fig. 4.
Fig. 12 is an end elevation with parts in section of the same clutch.
Fig. 13 is a view of a part of the transmission mechanism looking up from the bottom of the machine with the casing removed.
Fig. 14 is a wide elevation of Geneva gears which form a part of the power transmission mechanism.
Fig. 15 is a side elevation of another of said gears.

Referring to Fig. 13 in which the main shaft 333 is illustrated as viewed from the bottom of the machine, a sprocket 407 is shown as keyed to the shaft and as carrying a chain 408 which extends upwardly to drive the ejector roller 312 of Fig. 9 through means not shown. The main shaft 333, as also shown in Fig. 13, carries a pair of platen actuating cams 354 which, as previously described, swing the platen upwardly to its printing station. The ticket shearing knife is actuated by the cam 332, also carried by the main shaft. The counter-shaft 320, which supports the quadrant 321 for driving the strip feeding mechanism, therefore imparting rotation to the main shaft of the printing head, is also shown in Fig. 13 and is connected to the main shaft 333 through the medium of a double-acting Geneva movement mounted on another counter-shaft which, for convenience, will be referred to as the Geneva shaft 414. The outer end of this Geneva shaft 414 carries a sprocket 415 which, through a chain 416, drives a sprocket 417 carried by one of the pair of splined cam shafts 166 of the selector mechanism. A gear 418, also carried by said shaft, drives a gear 419 on the other shaft 166, which is not shown in Fig. 13, through an intermediate idler 420. This imparts to the cam shafts 166 the complete rotation necessary to the operation of the selector mechanism during each ticket printing operation of the machine.

The Geneva movement, interposed between the main shaft 333 and the counter-shaft 320, is especially designed to transmit the uni-directional motion of the main shaft to rotation in opposite directions of the counter-shaft with intermediate dwell periods. As shown in Figs. 13, 14 and 15, the main shaft carries a gear 425 meshing with a gear 426 which rotates freely on the Geneva shaft 414, and which carries with it a Geneva driving member 427 adapted to drive a Geneva driven member 428 in one direction. Also carried by the main shaft is a gear 439 which, through a pinion 430, drives a gear 431 fixed to the Geneva shaft and carrying a Geneva member 432 like the member 427 but rotating in the opposite direction to impart such rotation to the Geneva driven member 428.

The construction of the driving and the driven members of the Geneva movement is illustrated in Figs. 14 and 15. In Fig. 14 the driven member 428 is shown in registry with the driving member 432. The driving member 427 shown in Fig. 15 lies directly behind the member 432 and rotates oppositely thereto and in a different phase position, its relative phase position being that shown in Fig. 15. The driven member 428 comprises a gear segment 435 at opposite ends of which are recesses 436 and 437 cut arcuately to the pitch diameter of the driving members 427 and 432. Each of these driving members has a set of gear teeth 438 cut to mesh with the teeth 435 of the driven member during a portion of their rotation, and at both ends of the teeth 438 are peripheral surfaces 439 and 440, formed on the pitch diameter of the teeth 438, for registry with the recesses 436 and 437 on the driven member to cause the same to dwell when the teeth of the driving members are not in driving engagement with the teeth of the driven member. The remainder of the periphery of each of the driving members is cut away for clearance, as shown at 441, to permit free rotation of the driven member while the other driving member is in mesh with the driven member to impart rotation to it.

As viewed in Fig. 14, the driving member 432 rotates continuously in counter-clockwise direction during rotation of the main shaft. In the position shown, its teeth 438 have just left their mesh with the teeth 435 of the driven member during which mesh the driven member was rocked in a clockwise direction to impart clockwise rotation to the shaft 320 which, as has been described, rotates the main shaft of the printing head to effect selection of the type to be printed. In the position shown, the surface 439 of the driving member registers with the recess 436 of the driven member, causing it to dwell until the time when the teeth of the driving member 427, which is moving in clockwise direction, will mesh with the teeth 435 of the driven member, imparting to it and the shaft 320 rocking movement in a counter-clockwise direction, which is effective to return the main shaft of the printing head to its normal position and to advance the ticket strip. The driving members 427 and 432 are identical in shape but operate in opposite directions to rock the shaft 320 intermittently in opposite directions and to cause it to dwell between its rocking motions.

Figure 3:
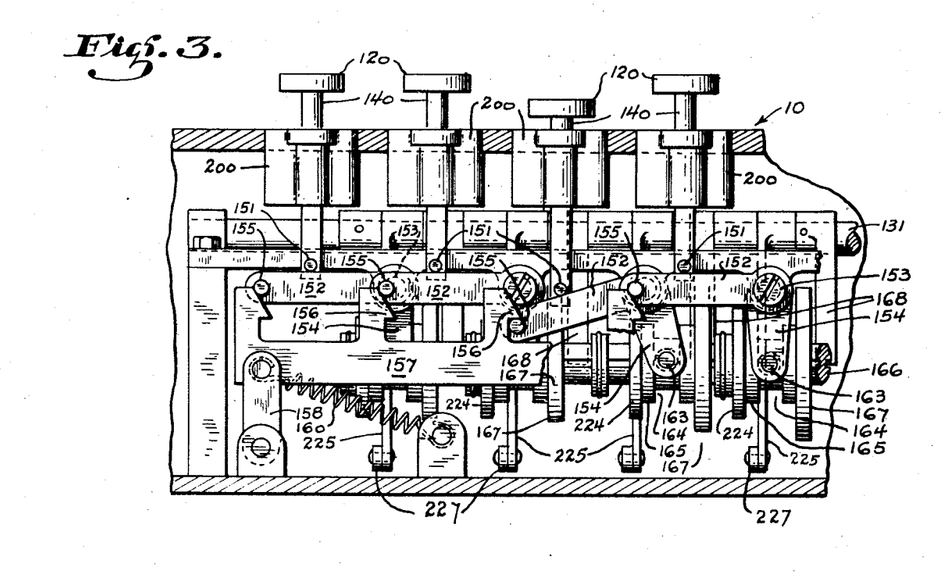
Fig. 3 is a front elevation on an enlarged scale of a portion of the mechanism illustrated in Fig. 1.
Figures 16, 17:
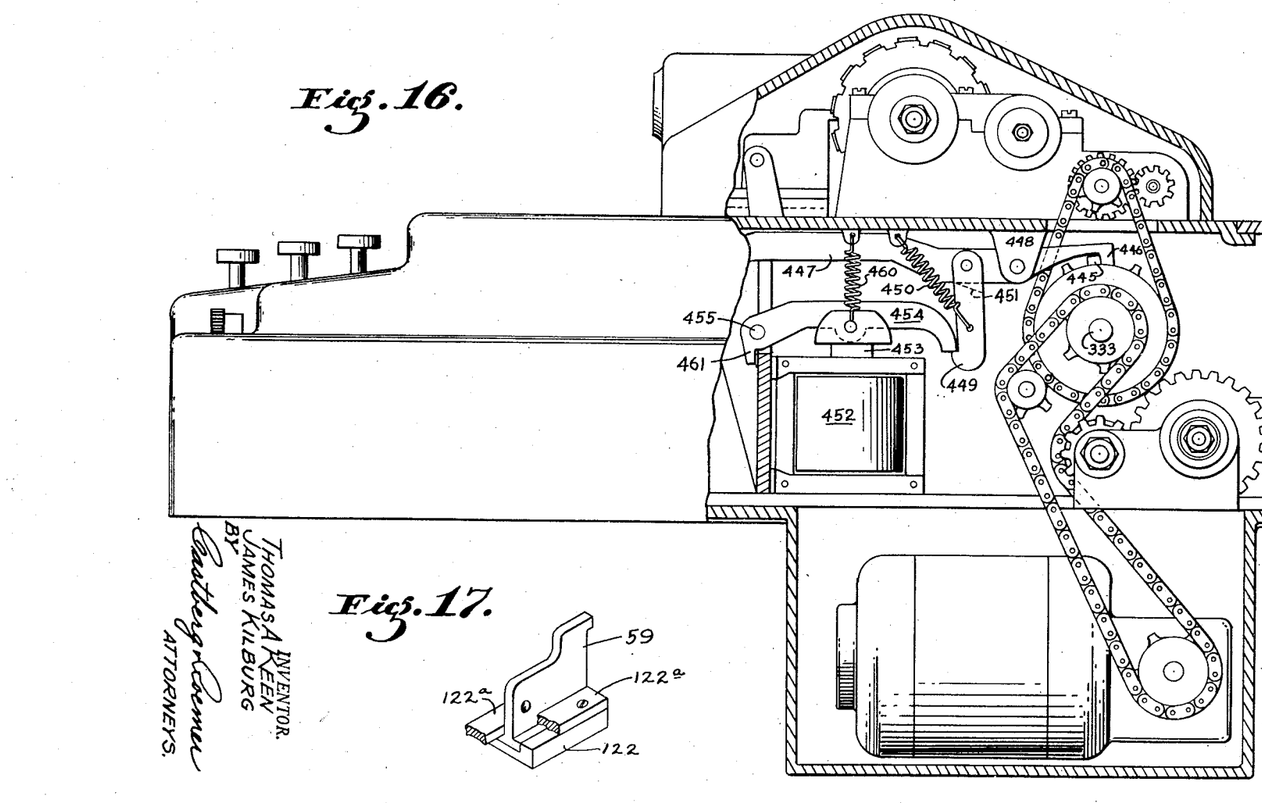
Fig. 16 is a side elevation of the machine with the casing broken away to disclose the motor drive and clutch control mechanism.
Fig. 17 is an isometric view of a selector finger illustrated in Fig. 1 illustrating the manner in which the same is mounted for sliding movement.

The selection of the type face on the disc 24 is effected through keys 120 arranged in two banks adjacent the forward end of the machine and numbered to correspond to the numbering on the disc 24. Assuming the disc 24 to be the one which prints the number of the entry upon which a bet is placed, the keys 120 are numbered to correspond to the numbers on its type faces, and depression of any key will effect printing of its corresponding number on a ticket. The mechanism which connects the keyboard with the entry disc 24 to effect printing of a number corresponding to the number of the key depressed is shown in Figs. 1 and 3. In Fig. 1, a selector plate 54 is shown as mounted on the printing head shaft 17 and is connected with the type disc 24 through a pin and slot connection 57. A selector finger 59 is carried by a block 121 mounted for sliding movement to and away from the axis of the selector plate 54 in a track 122. The selector finger 59 and the track in which it operates are also shown in Fig. 17 wherein the track is illustrated as comprising the grooved block 122 and a pair of plates 122a screwed thereto to confine the T-shaped lower section of the selector finger thereby guiding it for reciprocation to and away from the selector plate. Consequently, the selector finger 59 may be advanced or retracted to register with any desired step in the helical peripheral surface of the selector plate 54, which steps are spaced radially to correspond to the spacing of the type faces on the disc 24. A lever 123 connects with the block 121 through a pin and slot connection 124. This lever is pivoted on a pin 125 carried by a bracket 126. At its lower end the lever 123 is pivoted as shown to the upwardly extending end 135 of a link 127. This end 135 of the link 127 is adjustably connected thereto by a fitting 136, the purpose of which is to permit adjustment of the effective length of the lever and clamp it securely in its adjusted position. The opposite end of the link 127 is pivotally connected as at 128 to a lever 129. This lever 129 is keyed to a shaft 130 which, like an identical shaft 131, extends transversely of the machine. The shafts 130 and 131 are connected together to be oscillated simultaneously, as shown in Fig. 2, by a pair of levers 132 and 133 keyed to the shafts and connected at their lower ends by a link 134. Thus, upon oscillation of either of the shafts 130 or 131, the lever 129 will be oscillated and, through the link 127 and lever 123, the selector finger 59 will be advanced or retracted a distance depending upon the degree of oscillation of the shafts 130 and 131. These shafts are adapted to be oscillated by depression of any one of the keys 120 and the degree of oscillation will depend on the key depressed.

Figures 7, 8:
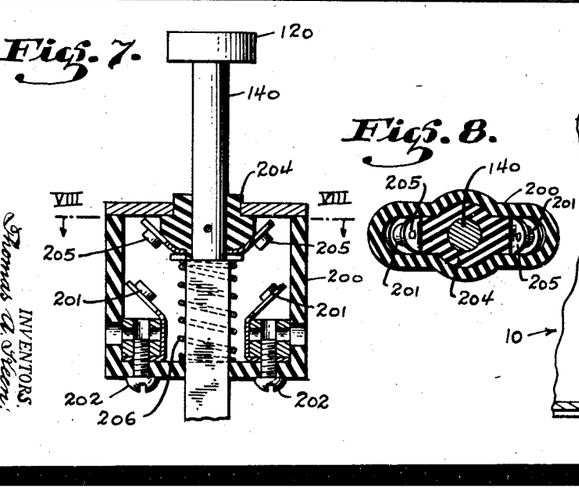
Fig. 7 is an enlarged detail view in section of an electric switch associated with one of the keys illustrated in Fig. 1.
Fig. 8 is a sectional view taken on line VIII—VIII of Fig. 7.

The keys 120 are supported on shafts 140 which, as shown in Fig. 7, are mounted for vertical reciprocation through a housing 200 which contains a spring 206 normally urging the keys to their raised position. Adjacent its lower end each of the posts 140 carries a projecting pin 151 (see Figs. 1 and 3) engageable with a lever 152 which will be swung downwardly upon depression of the key. The lever 152 is fixed to a pivoted bushing 153 which also carries a downwardly extending lever 154 so that the levers 152 and 154 function in the manner of a bell crank. Depression of any one of the keys 120 swings its associated lever 152 downwardly so that a pin 155 on said lever engages beneath a latch 156 on a latch bar 157. The latch bar 157 extends transversely of the keyboard and carries a latch 156 for each of the keys in the bank with which it is associated. The latch bar 157 is mounted on parallel links, one of which is shown at 158 in Fig. 3, which permit it to move to the side sufficiently for the pin 155 to engage under the latch 156. A spring 160 normally urges the latch bar to the right and retains the pin 155 and its lever 152 in lowered position, as illustrated in connection with the depressed key in Fig. 3, and it is held in this position until depression of another key which effects release of the first key depressed and itself becomes latched.

The levers 152 and 154 are swung in a counterclockwise direction upon depression of the key against the tension of a torsion spring 161 wound about the connecting bushing and normally urging them in the opposite direction. A pin 163 carried by the lower end of the lever 154 projects into a groove 164 of a collar 165 which is slidable on a shaft 166 but splined against rotation on said shaft. Each of the collars 165 carries a cam 167 which, upon sliding movement of the collar to the right, which is effected by depression of the key which controls it, moves into alignment with a cam lever 168 fixed to the shaft 130 or 131, as the case may be. There are, it should be understood, a pair of the latch bars 157, one for each key bank, and these bars are connected together for simultaneous movement. Likewise there are two of the shafts 166 and every key in each bank controls a cam 167 on one of these shafts, through mechanism identical with that just described. The cam levers 168 which depend from the shafts 130 and 131 are identical with the exception of that one shown at 129 in Fig. 1, which carries the pivot 128 at its lower end. The cams 167 are similar in shape but graduated in size. Their normal position is that shown in Fig. 1, with a flat side 169 registering with the lever 168.

Upon each ticket printing operation of the machine the shafts 166 are rotated through one complete revolution by the drive mechanism. Consequently, the cam 167 which has been selected and aligned, by depression of a key with its lever 168, engages and rocks that lever, imparting oscillation to the shafts 130 and 131, the degree of which oscillation depends upon the size of the cam 167. As these cams are graduated in size corresponding to the number of the keys, the key depressed will determine the distance the selector finger 59 is advanced prior to the printing operation and will further determine, through the selector plate 54, the type face which is to be selected for printing.

The motor 400 from which the operating power of the machine is derived runs continuously, while the actual operation of the machine is intermittent. Upon each operation the machine operates through a full cycle, imparting a complete rotation to each of the shafts 166 and also imparting the movement heretofore described to the printing head and printing action of the platen.

Depression of any one of the keys 120 effects closing of a circuit to the solenoid 452 to be described later to initiate a ticket printing operation of the machine, through a switch which forms a part of the key structure, as illustrated in Fig. 7 and which includes a pair of contact members 201 retained in place within the housing by screws 202 which also function to clamp the ends of wires to the contact members, the wires forming a part of the switch circuit to the main clutch solenoid. The key post carries a dielectric bushing 204 which supports a contact bridging member 205. Depression of the key against the tension of the spring 206 brings the bridge 205 into contact with the members 201 to close the circuit to the clutch solenoid. The main clutch which is shown at 406 in Fig. 13 is normally disengaged. It is permitted to engage for a single cycle to impart a complete rotation to the main drive shaft 333 once for each ticket printing operation of the machine. This clutch includes a lug 445, see Fig. 16, by means of which it may be held in disengaged position the internal construction of the clutch being the same as that substantially disclosed in Figs. 11 and 12 presently to be described in detail. The hooked end 446 of a lever 447 normally engages behind this lug and prevents engagement of the clutch. Upon raising of the hooked end 446 of this lever to clear the lug 445, the clutch engages and drives the main shaft 333 until the lug 445 again comes into contact with the end of the lever. The lever 447 is pivoted as at 448 and carries a downwardly extending pivoted pawl 449. A spring 450 urges the pawl to the left and to a position substantially perpendicular to the lever 447, at which position it stops by reason of a shoulder 451 which engages with the bottom of the lever. The pawl thus normally assumes the position illustrated but is free to swing to the right against the tension of the spring 450. A solenoid 452 has a retractable armature 453 pivoted to a lever 454 which is in turn pivoted as at 455 at one end and engages with the pawl 449 at its opposite end. A spring 460 tends to hold the armature and the lever 454 upwardly in a position limited by a stop tail 461 on the lever. The solenoid 452 is energized by closing the key switch hereinbefore described. This energization of the solenoid retracts the armature which, through the lever 454 and the pawl 449, swings the lever 447 about its pivot 448 to raise its end 446 free of the lug 445. The end of the pawl 449 swings away from the lever 454 during this operation, its movement being on an arc struck from the center of the pivot 448. Consequently, a single cycle operation is insured even though the operator should fail to release the key which effects energization of the solenoid.

If, due to such improper operation, the solenoid and lever 454 remain in their down position, the spring 450 returns the pawl 449 and the lever 447 to normal, and, in being returned, the pawl 449 rides over the end of the lever 454. Upon subsequent de-energization of the solenoid the lever 454 will rise about its pivot under the tension of the spring 460 and, in so doing, its end will swing the pawl out of the way and come to rest in the position illustrated. Thus upon depression of any key on the keyboard, the clutch 406 will engage for a single cycle only to drive the machine through a single complete ticket printing and issuing operation.

Figure 4:
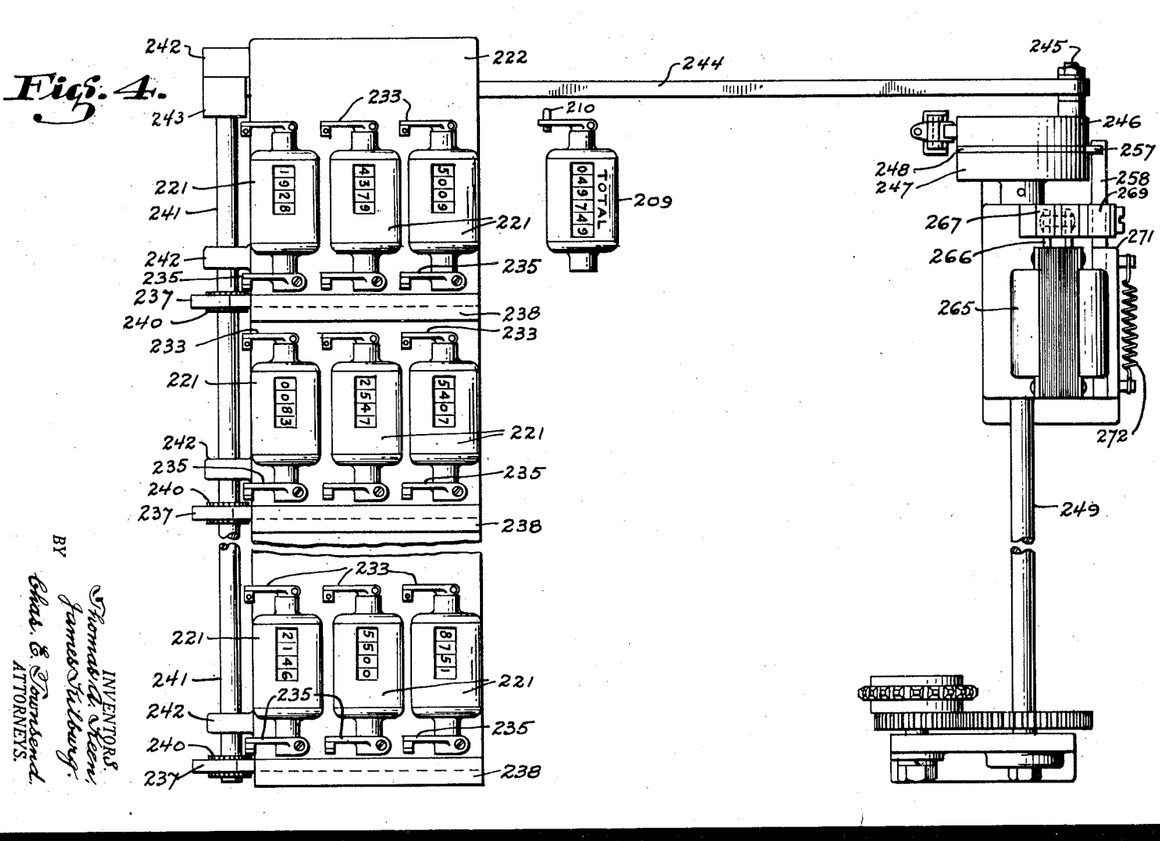
Fig. 4 is a plan view of the counters and counter reset mechanism of the present invention.
Figure 5:
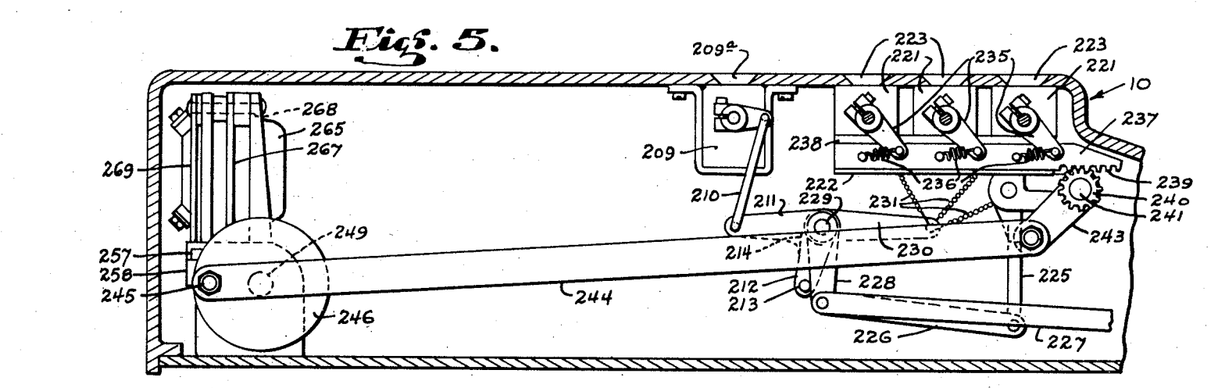
Fig. 5 is a fragmentary sectional view of the machine disclosing a side elevation of the mechanism illustrated in Fig. 4.

Each of the twelve keys 129 may represent one of twelve entries in a race, and in order to register the number of tickets issued by the machine on each entry separately, there are twelve mechanical counters shown at 221 in Figs. 1, 4 and 5, mounted on a plate 222 which supports them in a position with their counter dials in registry with sight openings 223 formed in the main housing of the machine. The counters 221 may be arranged in three banks of four each, as shown, and are connected for operation with their respective keys 120 in the following manner:

Referring again to Fig. 3, each of the collars 165 which carries a selector cam 167 on its right side also carries on its left side a counter actuating cam 224. The cams 224 are, as illustrated in Fig. 1, circular with a flat side, which flat side registers with a lever 225 when the collar 165 is moved to the right in the manner illustrated in Fig. 3. The levers 225 depend from the shafts 130 and 131, with respect to which they are free to oscillate, and their lower ends are connected by links 226 and 227 with the vertical arms 228 of a bank of bell cranks pivoted to a shaft 229 extending transversely of the machine. Horizontal arms 230 of the same bell cranks are connected each with one of the counters 221 by means of a flexible cable or, as shown in the present instance, a length of bead chain 231 led through guide holes 232 in the bed plate 222, and these chains connect with conventional actuating levers 233 of the counters. Thus upon depression of any one of the keys 120 the consequent shifting of its collar 165 and rotation of the shaft 166 causes the associated counter acuating cam 224 to turn through a complete revolution, rocking its lever 225 which, through the lever 226 or 227, as the case may be, rocks the bell crank which drops downwardly upon the chain 231 to actuate the counter associated with the key which was depressed, thus registering the sale of a ticket upon an entry identified by the number of said key and counter.

As the shafts 166 receive their rotary movement from the main source of power of the machine, there is no energy expended on the part of the operator of the machine in effecting registration of each operation.

In order to reset the counters to zero, each of the counters is provided with a lever 235, as shown in Figs. 4 and 5, as is conventional practice with counters of this kind. To effect simultaneous resetting or zeroizing, the levers 235 are connected, preferably by stiff springs as illustrated at 236, to sliding bars 237 guided in channels 238 secured to the top of the bed plate 222. There are four of the bars 237, one for each line of counters, and the forward lower edge of each bar is toothed to form a rack 239 which meshes with a gear 240. The four gears 240 are pinned to a shaft 241 rotatable in bearings 242 and extending transversely of the machine. At one end the shaft 241 carries a lever 243 keyed to the shaft and pivoted at its lower end to a connecting rod 244 which extends toward the rear of the machine where it is driven by a crank pin 245 and a crank disc 246. The crank disc 246 is normally stationary but may be caused to revolve 360° and, upon so doing, oscillates the shaft 241 which, through the gears 240, reciprocates the bars 237 simultaneously to reset all of the counters to zero.

The power for effecting the zeroizing of the counters is also derived from the main source of power of the machine. To accomplish this, the disc 246 forms the driven part of a single cycle clutch of which the driving part is shown at 247, and an intermediate disc at 248 (see Fig. 6). The driving part 247 is carried by and rotates with a continuously rotating shaft 249. The driven part 246 is normally stationary but is driven one complete revolution upon release of a lug 257 on the disc 248, this lug normally being held against rotation by a stop member 258. In order, therefore, that the continuously rotating member 247 may impart a single revolution to the part 246, the stop 258 is withdrawn to permit the lug 257 to pass and to permit the rollers 253 to move into their wedging position. Upon the completion of a single cycle, the lug 257 again comes into contact with the stop 258 and the lugs 256 stop the rollers 253, imparting pressure on the springs 255 which tends to reverse the direction of the inner member 251. While the driven member is in its position of rest any tendency for it to move in reverse resulting from the tension of the springs 255 may be overcome by a latch 260 projecting from its periphery and engageable with a pivot pawl 261.

Figure 6:
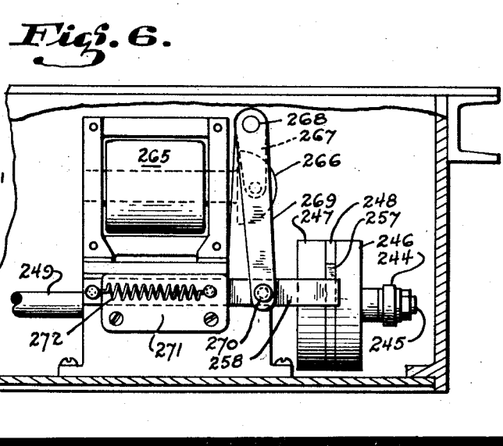
Fig. 6 is an end elevation of a portion of the same mechanism illustrating the construction of the clutch and clutch solenoid used in resetting the counters.

To impart a single revolution to the clutch part 246, the stop member 258 is withdrawn to permit the lug 257 to pass, and as the stop member returns to its original position after being withdrawn, the lug 257, upon completion of a single cycle, again comes into contact with it, bringing the driven part of the clutch to rest. It is desirable, in order to enable resetting of the counters of a large group of machines simultaneously, from a remote point, and also to effect resetting of the counters with it at a minimum expense of energy, that the reset mechanism be controlled electrically. To accomplish this, the stop member 258 is adapted to be retracted momentarily to effect single cycle operation of the reset clutch through the medium of a solenoid 265. This solenoid has a retractable armature 266 pivoted at its outer end to a short lever 267 which is fixed to a shaft 268. Also fixed to the shaft 268 is a long lever 269 connected at its lower end by a pin and slot connection 270 with the stop member 258. The stop member is slidably guided in a guide 271 and a spring 272 urges it toward its stopping position. When it is desired to zeroize all of the counters, the solenoid 265 is energized to retract its armature, and thus, through the levers 266 and 267, to retract the stop member 258, freeing the lug 257 and permitting rotation of the driven member of the clutch through a single cycle which effects the reset of the counters.

In addition to the counters which have been described for the purpose of registering the sale of tickets on individual entries, a total counter is provided which registers the total of all sales on all entries. This counter, shown at 209 in Figs. 1, 4 and 5, is connected for actuation by a link 210 with a bell crank 211 which is pivoted on the shaft 229 and has a depending arm 212. The lower end of the 212 supports one end of a bar 213 which extends transversely of the machine directly behind the bell crank 228, which latter takes part in the operation of the counters for the individual entries. The opposite end of the bar 213 is supported by an arm 214, shown in dotted lines in Fig. 5, which also depends from the shaft 229 and corresponds in length and shape to the arm 212 of the bell crank 211. As the bar 213 extends behind all of the bell cranks 228, movement of any one of them to actuate one of the entry counters will swing the bar to the rear and rock the bell crank 211 which, through link 210, will actuate the counter 209. The dials of the counter 209 may be viewed through a suitable opening 209a in the main housing of the machine.

Having thus described our invention, what we claim and desire to secure by Letters Patent is:

In a machine for printing tickets or the like, which has key selectable type setting mechanism including a rotatable shaft, and cams slidable on said shaft, a plurality of counters associated with type selecting keys, and means whereby depression of a key will effect sliding of cams on said shaft to a position for controlling the type setting mechanism and a counter associated with the key depressed.

THOMAS A. KEEN.
JAMES KILBURG.